June 5, 1945.  C. A. MARTIN  2,377,437
MACHINE FOR CUTTING ARTICLES
Filed June 1, 1944  4 Sheets-Sheet 1

INVENTOR
Charles A. Martin
BY
ATTORNEYS

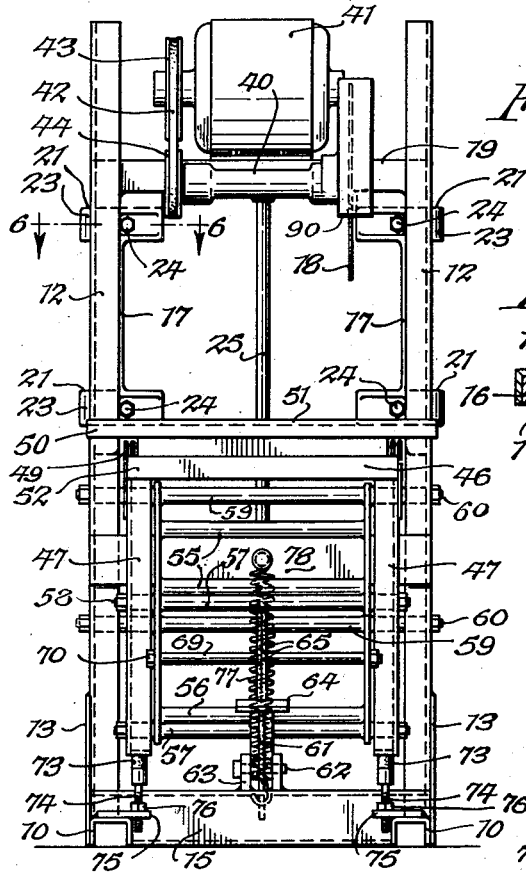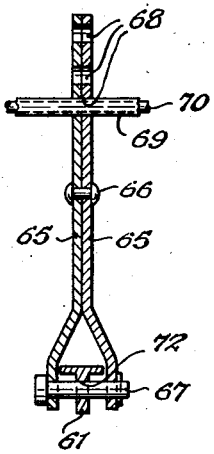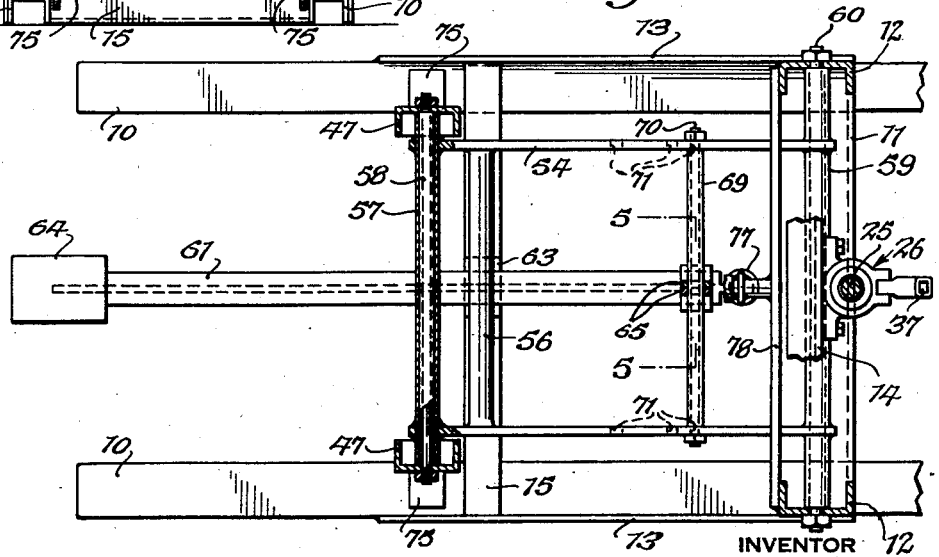

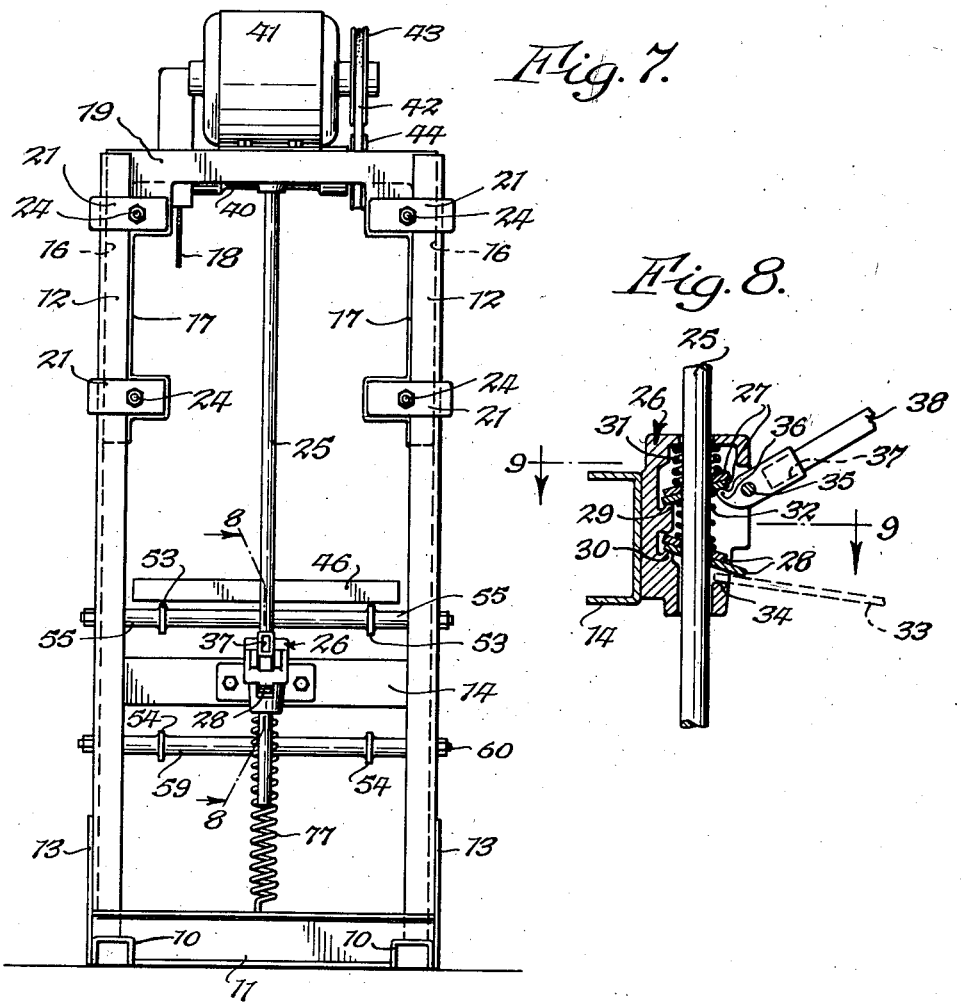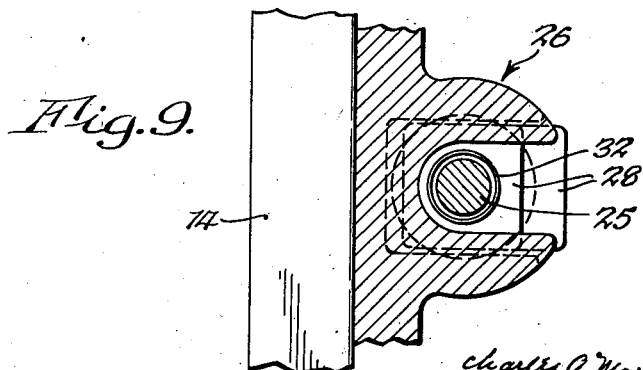

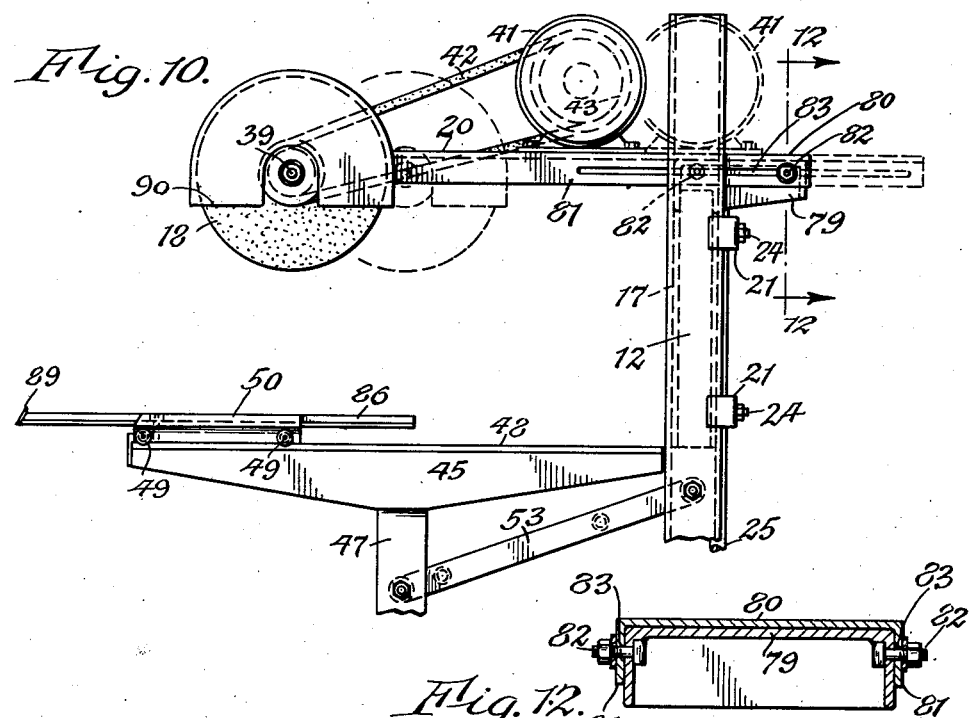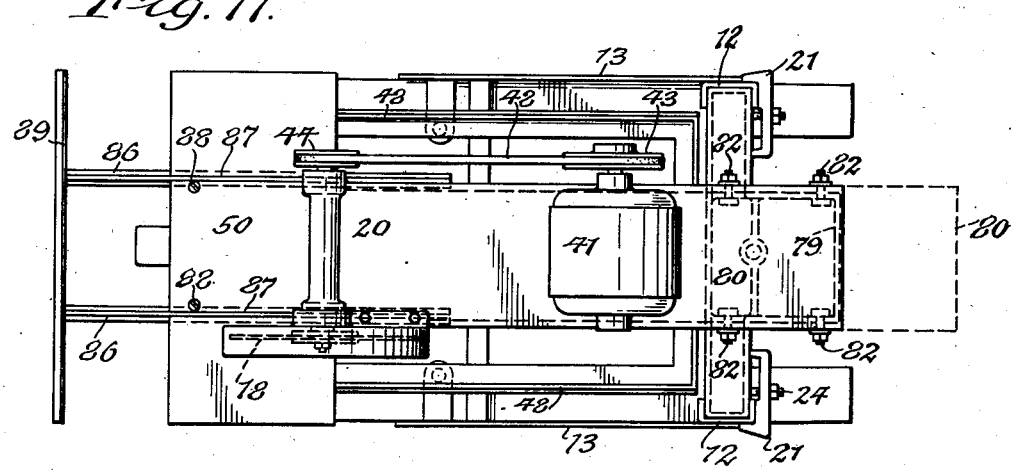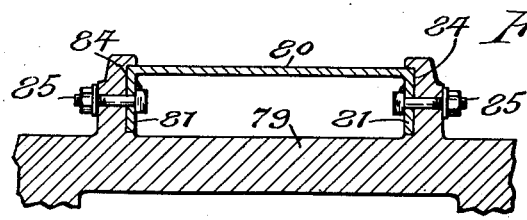

Patented June 5, 1945

2,377,437

UNITED STATES PATENT OFFICE 2,377,437

MACHINE FOR CUTTING ARTICLES

Charles A. Martin, Buffalo, N. Y.

Application June 1, 1944, Serial No. 538,284

8 Claims. (Cl. 125—13)

This invention relates to a machine for cutting tile, building blocks and the like. In machines of this character, as hertofore constructed, the abrasive cutter blades which are very fragile and rotate at a high speed have been so mounted that they are bodily movable toward and from the workpiece and the latter is also reciprocated forwardly and backwardly relative to the blade during the cutting operation inasmuch as repeated strokes of the workpiece past the blade are required for successively increasing the depth of the kerf or groove in the workpiece before the cutting operation is complete. Inasmuch as the abrasive cutting blades have no teeth, such as are used in wood saws which clean out the dust or cuttings from the groove in the material which is being cut, it is necessary when using an abrasive cutter blade to reciprocate or oscillate the workpiece repeatedly back and forth relative to the cutter blade in order to clean the dust or cuttings from the kerf or groove and permit the cutting to proceed effectively.

When moving a cutter blade bodily toward and from the path of a workpiece the same is not rigid and therefore makes it necessary to employ cutter blades which are comparatively thick in order to withstand the vibration and secure uniform and accurate cuts as well as avoiding breakage of the blades which are expensive to replace.

One of the objects of this invention is to provide a machine for cutting cementitious tiles, blocks, slabs and the like in which the rotary cutting blades or disks are rigidly mounted so that the same are incapable of bodily movement during the normal operation of the machine and thus ensure greater accuracy and uniformity in the cutting of grooves in the material being cut and also permit the use of thinner blades which are less expensive and thus reduce the cost of maintenance.

A further object of this invention is to provide an apparatus for this purpose which is sturdy in construction and capable of cutting tile and the like expeditiously with a minimum expenditure of power, and also is readily adjustable for cutting material which varies in height and length.

In the accompanying drawings:

Fig. 3 is a front elevation thereof.

Fig. 4 is a horizontal section of the same, taken on line 4—4, Fig. 1.

Fig. 5 is a fragmentary vertical section, taken on line 5—5, Fig. 4.

Fig. 6 is a fragmentary horizontal section, taken on the correspondingly numbered line in Fig. 3.

Fig. 7 is a rear elevation of the machine.

Fig. 8 is a framentary vertical section, on an enlarged scale, taken on line 8—8, Fig. 7.

Fig. 9 is a fragmentary horizontal section, on a still larger scale, taken on line 9—9, Fig. 8.

Fig. 10 is a fragmentary side elevation of the upper part of a cutting machine embodying a modified form of this invention.

Fig. 11 is a top plan view of the same.

Fig. 12 is a cross section, on an enlarged scale, taken on line 12—12, Fig. 10.

Fig. 13 is a section similar to Fig. 12, showing a modified form of the connection between the horizontally adjustable arm which supports the cutter and motor mechanism and the carriage which is adjustable vertically on the main frame.

In the following description like reference characters indicate the same parts in the several figures of the drawings.

Figure 1:
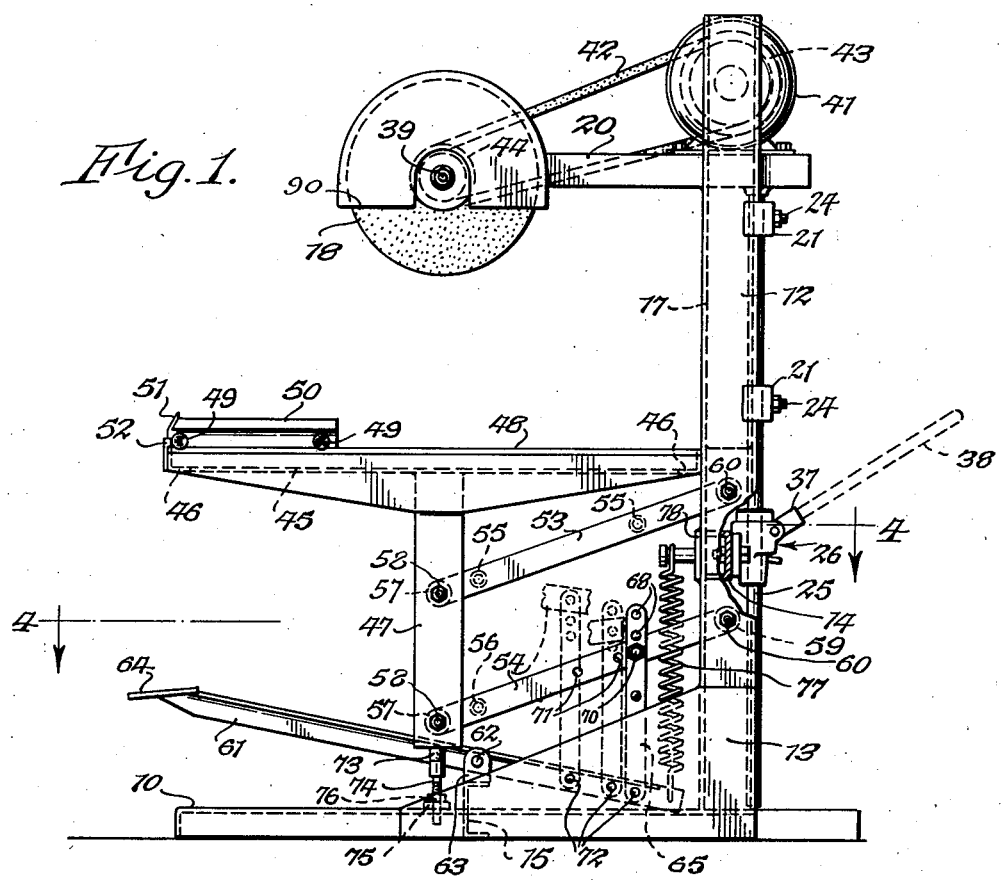
Fig. 1 is a side elevation, partly broken away, of a cutting machine embodying one form of this invention and showing the same in a position for cutting material of the maximum height within the range of the machine.

Although the main frame which supports the several working parts of this apparatus may be variously constructed, the same, as shown in the drawings, preferably comprises a base having two longitudinal spaced side sills 10, 10, a lower transverse rear sill 11 connecting the rear ends of the side sills, two spaced upright standards 12, 12 which rise from the corners at the junction of the side and rear sills, corner plates 13 connecting the adjacent parts of the side sills and standards, an upper sill 14 connecting said standards between the lower and upper ends thereof, and an intermediate cross bar 15 connecting the side sills between the front and rear ends thereof. A frame is thus produced in which the front ends of the longitudinal sills are disconnected and form an open space in which the operator may stand close to the machine while operating the same and if desired the machine may straddle any object on the floor. The standards are preferably made of steel bars which are channel-shaped in cross section and have their concave sides facing or opposed to each other so that the same form vertical guideways 16 in which are adjustably mounted two upright legs or runners 17 which form part of a vertically movable carriage which supports the article cutting tool 18 and the means for operating the same. In addition to these vertical runners the carriage comprises a horizontal cross bar 19 which connects the upper ends of the runners and a horizontal supporting arm 20 which has its rear end connected with this cross bar while its front end projects longitudinally forward therefrom.

Upon raising or lowering the carriage the cutter 18 may be shifted to suit the height of the article which is being cut. Retaining means are provided whereby the cutter supporting arm 20 and carriage 17, 19 may be held in its adjusted position, which retaining means preferably also serve to tie together the carriage and the upper parts of the standards of the main frame so as to produce a very strong and durable supporting structure for the machine. In their preferred form these retaining means are constructed as follows:

The numeral 21 represents clamping dogs each of which has the form of a plate extending horizontally across the rear side of the upper part of one of the frame standards and the adjacent part of one of the runners of the carriage and which has an inner toe 22 engaging with the rear side of the respective runner while its outer end is provided with a hook 23 engaging with the outer side of the upper part of the respective standard and a clamping bolt 24 connecting the central part of this dog with the adjacent part of the respective runner, as shown in Figs. 1, 2, 3, 6 and 7. Upon loosening the clamping bolts 24 the carriage may be moved vertically on the frame into the desired position and then held there by tightening these bolts. Owing to the hooks 23 of these dogs engaging with the outer sides of the frame standards these retaining means serve to prevent lateral movement of the frame standards and the carriage legs or runners and thus prevent the frame standards from spreading and instead rendering the structure strong and rigid.

Moreover, by extending the legs or runners of the carriage downwardly from the supporting arm of the same it is possible to raise this carriage a considerable distance relative to the frame and still maintain an overlapping engagement with the frame standards, thereby permitting of raising the cutter and associated parts to a greater extent than would otherwise be possible without making the frame permanently of undue height.

For the purpose of enabling the carriage and its load to be easily and conveniently raised and lowered by manual power a shifting mechanism is provided which is preferably constructed as follows:

The numeral 25 represents a vertical shifting rod which is secured at its upper end to the central part of the cross bar 19 of the carriage and slides with its lower part through a clutch casing 26 which is secured to the frame bar 14 and forms part of a step-by-step shifting device. Within this casing are arranged a pair of upper clutch plates 27 and a pair of lower clutch plates 28 each of which is provided with an opening in which the shifting rod is arranged. The clutch plates 27 of the upper pair are superposed and the lower one of this pair rests with its inner end on a shoulder 29 within the clutch casing 26 and the lower one of the lower pair of clutch plates rests at its inner end on a shoulder 30 on the clutch casing. The numeral 31 represents a spring which is interposed between the upper side of the upper clutch plate 27 of the upper pair and 32 a spring interposed between the lower clutch plate 27 of the upper pair and the upper clutch plate 28 of the lower pair.

When the clutch plates are at rest the upper pair are loose on the lifting rod 25 while the members of the lower pair of clutch plates incline outwardly and the front parts of their inner edges grip the front side of the shifting rod while the rear parts of their inner edges grip the rear side of this rod, as shown in Fig. 8, and thereby operate to prevent this rod and any load supported thereon from descending.

If it is desired to lower the shifting rod and the parts connected therewith the rear ends of the lower clutch plates are lifted by placing a releasing bar 33 or the like between the underside of the lower member of the lower pair of clutch plates 28 and shoulder 34 on the clutch case, as shown by dotted lines in Fig. 8, and turning this bar so as to raise the rear ends of this pair of clutch plates. When this occurs the grip of the front and rear edges of the openings in these plates on this rod is released and this rod is permitted to slide downwardly by gravity through these clutch plates until this bar is again turned in the direction to permit the lower clutch plates to tilt downwardly at their rear ends. As a result these lower plates again grip the shifting rod and prevent the further descent of the same.

When it is desired to lift the shifting rod the upper pair of clutch plates are tilted upwardly at their rear ends so that the front and rear parts of their inner edges grip the corresponding parts of the shifting rod and upon continuing an upward pressure against the rear parts of the upper clutch plates, after the same have been thus tilted, the shifting rod and the carriage connected with the same will be lifted. During this upward movement of the shifting rod the same slides freely through the lower clutch plates 28 without interference from the latter.

Upon permitting the rear ends of the upper clutch plates to descend the grip of the same on the shifting rod is released and the grip of the lower clutch plates on this rod is restored, thereby holding the latter in whatever vertical position the same may occupy. Raising of the rear ends of the upper clutch plates may be effected by various means, for example, by a releasing lever pivoted by a pin 35 on the casing 26 and having a front arm 36 adapted to engage underneath the lower member of the upper pair of clutch plates, as shown in Fig. 8, while its rear arm is provided with a socket 37 adapted to receive a handle or bar 38 for oscillating this releasing lever. This bar 38 may be used as the bar 33 for operating the lower clutch plates when it is desired to lower the shifting rod and its load. If desired gravity alone may be employed for depressing the clutch plates but it is preferable to also employ the springs 31, 32 to insure certainty of operation.

Figure 2:
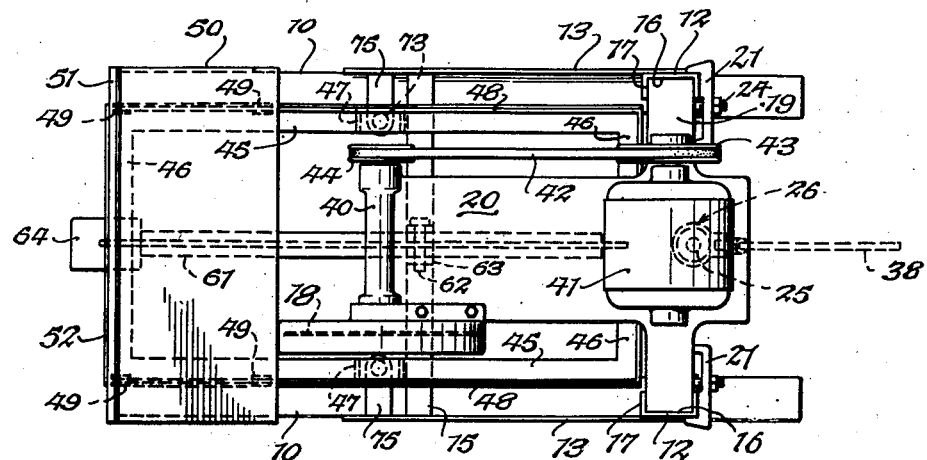
Fig. 2 is a top plan view of the same.

The tool for cutting the tile, building block or the like preferably has the form of a thin circular disk or blade of abrasive material, such as carborundum, and is mounted for rotation about a horizontal transverse axis on a shaft 39 which is journaled in a bearing 40 mounted on the front end of the carriage arm 20, as shown in Figs. 2 and 3. Power for operating the cutting blade is preferably derived from an electric motor 41 mounted on the rear part of the carriage and motion is transmitted from this motor to the cutter blade by a belt 42 passing around a driving pulley or wheel 43 on the motor shaft and a driven pulley or wheel 44 on the cutter shaft.

The means for presenting the workpiece to be cut to the blade 18 are constructed as follows:

In front of the frame standards 12 and over the base sills 10 is arranged an elevator which comprises two longitudinal side bars 45, front and rear cross bars 46 connecting the front and rear ends, respectively, of the side bars and vertical legs 47 projecting downwardly from the central parts of the side bars. On the upper side of the side bars 45 the same are provided with longitudinal rails 48 which form a track on which run the wheels 49 of a longitudinally movable table 50. The tile building block or other workpiece to be cut is placed on the table and by moving the elevator vertically and the table horizontally this workpiece may be moved relatively to the cutter blade for producing the cutting operation.

At its front end the table is provided with a locating bar 51 against which the front side of the workpiece rests for properly placing and holding the same while being cut, and the forward movement of the table on the track is limited by a stop 52 on the elevator. The vertical movement of the elevator is controlled so that the track for the table always remains horizontal this being preferably accomplished by a parallel moving linkage comprising a pair of upper vertically swinging controlling or elevating links 53 pivotally connected at their front and rear ends with the elevator legs 47 and the frame standards 13, a pair of vertically swinging lower controlling or elevating links 54, cross bars 55, 56 connecting the intermediate parts, respectively, of the upper and lower controlling links, a front cross tube 57 connecting the front ends of each pair of elevator links and turning on a front cross rod 58 connecting the elevator legs, and a rear cross tube 59 connecting the rear ends of each pair of links and turning on a rear cross rod 60 which is connected to the frame standards.

Various means may be employed for moving the elevator vertically but those shown in the drawings are preferred and constructed as follows:

The numeral 61 represents a vertically swinging foot lever arranged below the elevator and pivoted between its front and rear ends by a pin 62 to a bracket 63 on the frame bar 15 and provided at its front end with a pedal 64. Motion is transmitted from this foot lever to the elevator by a lifting link which preferably comprises two upright link bars 65 having their intermediate parts connected by a rivet 66 while their lower ends are spread and straddle the foot lever and are pivotally connected therewith by a pin 67 passing through one or another of a longitudinal row of openings 72 in the rear arm of the foot lever, and their upper ends are provided with a vertical row of registering pairs of openings 68, a pivot tube 69 passing through one or another of the pairs of the openings 68 in the lifting link, and a horizontal pivot rod 70 upon which the pivot tube turns and which is adapted to be secured at its opposite ends on one or another pair of corresponding openings 71 formed in longitudinal rows, respectively, in the lower pair of lifting links 54. Upon depressing the pedal of the foot lever the elevator will be raised through the medium of the linkage connecting the same with the rear end of the foot lever and upon removing the foot pressure on the pedal the elevator will be lowered by gravity.

The article to be cut is placed on the table 50 while the same and the elevator are lowered and the table is on the front part of the elevator track. Thereafter the elevator is raised to bring the workpiece in front of the cutter blade and then the table may be oscillated past the cutter blade for producing the desired cut in the workpiece.

When the workpiece is comparatively low it is necessary to raise the elevator a considerable distance in order to bring the workpiece into position relative to the cutter blade to permit of cutting the workpiece as desired, but if the workpiece is comparatively high the required vertical movement of the elevator is less than when cutting a low workpiece.

In order to permit the elevator to be raised a considerable distance when cutting high workpieces or a comparatively short distance when cutting low workpieces the connection between the opposite ends of the lifting link 65 and the foot lever and lower pair of elevator links 54 is shifted relative to the axes of this lever and these parallel links so as to change the leverage between these elements while maintaining substantial uniformity in the throw of the foot lever. Accordingly, if the connection between the lifting link 65 and the foot lever and the lower elevator links 54 is farthest from the axes of this lever and this pair of links, as shown by full lines in Fig. 1, then the elevator will be raised the maximum distance upon depressing the pedal of the foot lever. When, however, the connection between the lifting link 65 and the foot lever and elevator links 54 is shifted nearer the axes of the foot lever and the lower elevator links, as shown by one or the other of the positions of the lifting link, indicated by dotted lines in Fig. 1, the same throw of the foot lever will raise the elevator to a lesser extent. This adjustment of the relative throw of the foot lever and the elevator links is accomplished by shifting the pivot rod 70 and tube 69 from one pair of openings 68 in the lifting link 65 to another, and also by shifting the pin 67 from one opening 72 in the foot lever to another, and also by shifting the tube 69 and rod 70 from one pair of openings 71 in the lower elevator links 54 to another.

By thus maintaining the throw of the foot lever substantially uniform, the operator need not vary the depression distance of his foot to effect raising of the elevator different distances, thereby avoiding undue fatigue and also ensuring greater efficiency in the operation of the machine.

The downward movement of the elevator is limited by stops 73 which preferably consist of rubber blocks which are engaged by the lower ends of the elevator legs and thus cushion the stopping action of the elevator. These stops are preferably capable of being adjusted and for which purpose the same are mounted on the upper ends of screws 74 which engage at their lower ends with threaded openings in brackets 75 on the base sills 10 and which are held in place after adjustment by means of jamb nuts 76 applied thereto.

In order to relieve the operator from lifting the entire load when raising the elevator, counterbalancing means are provided such, for example, as a spring 77 connected at its lower end with the rear arm of the foot lever while its upper end is connected with a bar 78 secured to the standards of the main frame, as best shown in Figs. 1, 3 and 4.

It will be noted that in this machine the rotary cutter blade is rigidly mounted in its operative position, and incapable of bodily movement, thereby avoiding vibration and permitting the use of thinner blades without liability of breakage and still securing accurate and uniform cutting of grooves in the material being cut, whereby the cost of maintaining the apparatus in operative condition is materially reduced.

If desired the arm 20 which supports the cutter blade, motor and associated parts may be mounted so that the same is capable of horizontal, longitudinal adjustment thereon so as to make it possible to operate on workpieces of greater length.

This is preferably accomplished as follows:

The numeral 79 represents a guide shelf projecting rearwardly from the central part of the cross bar 19 at the upper end of the vertically movable carriage. The cutter blade 18, motor 41 and the parts associated therewith correspond to those shown in Figs. 1–9 and are mounted on the front part of a horizontally movable arm 80, similar to the arm 20, which slidable arm 80 is of channel shape in cross section and rests with its horizontal web on top of the shelf 79 while its longitudinal vertical flanges 81 engage with opposite vertical sides of this shelf, as shown in Figs. 10, 11 and 12. Upon sliding the arm 80 horizontally forwardly or backwardly the cutter 18 may be moved into a rearward position close to the upright standards 12 of the frame, as shown by dotted lines in Fig. 10, for cutting material which is comparatively short, or this cutter may be moved into a forward position more remote from the standards, as shown by full lines in the same figure, thereby permitting of positioning the cutter as best suits the length of the material being cut.

After the supporting arm 80 has been shifted into the desired position the same may be held rigidly on the vertically movable carriage by means of clamping bolts 82 passing through longitudinal slots 83 in the side flanges 81 of the supporting arm 80 and openings in the adjacent side parts of the shelf 79. When thus secured the supporting arm 80 is held by the bolts 82 against sliding and rocking on the shelf.

If desired the supporting arm 80 may be adjusted horizontally on the shelf 79 by sliding opposite longitudinal sides thereof in guide channels or ways 84 on opposite sides of the shelf 80, as shown in Fig. 13, and holding the same in place by means of clamping bolts 85 passing through the adjacent parts of this shelf, one or the other of these parts being provided with horizontal slots for the reception of these bolts to permit of sliding the supporting arm 80 in said channels. In this last mentioned construction the channels 84 prevent the arm from rocking and the bolts 85 perform the sole function of holding the supporting arm against sliding on the shelf.

Adjustable stop means are provided for the work supporting table 50 which are movable lengthwise of the latter for the purpose of adapting these stop means to material of various lengths which are to be presented to the disk cutter when the latter is adjusted to different positions lengthwise of the machine. In its preferred form this adjustable stop means, as shown in Figs. 10 and 11, is constructed as follows:

The numeral 86 represents two longitudinal guide bars which are slidable horizontally in longitudinal guideways 87 on the supporting table 50 and adapted to be held in position thereon by means of clamping screws 88 after being adjusted. At their front ends these guide bars are connected with a transverse stop or gage bar 89 which is adapted to be engaged by the front end of the material to be cut for limiting the forward movement of this material on the table and also compel this material to move rearwardly with the same during the operation of presenting the material to the cutter.

In machines for this purpose as heretofore constructed the cutter blade was moved toward and from the material to be cut by an arm which was pivoted to swing vertically and this necessitated shortening the lower front part of the hood or guard which enclosed the upper part of the cutter blade. By rotatably mounting the cutter blade in a normally stationary bearing and avoiding bodily movement of the cutter blade toward and from the workpiece, and moving the latter vertically and horizontally relative to the cutter blade, the lower front part of the guard or hood can be projected downwardly a greater extent, as shown in Figs. 1 and 10, thereby covering the cutter blade to a larger extent and increasing the protection to the operator accordingly.

From the foregoing description it will be evident that this invention provides a cutting machine which permits of easily cutting articles varying considerably in height and length without, however, making the machine itself unduly high or long and in which the working parts are readily accessible for inspection, adjustment and repairing.

I claim as my invention:

1. A machine for cutting articles comprising a main frame having a base and upright standards of channel shape projecting upwardly from the rear part of the base and having their channels opposing each other, a vertically adjustable carriage having depending legs slidable in said channels and a forwardly projecting arm, fastening means for rigidly and adjustably connecting said standards and legs including a plurality of clamping plates each of which extends across one of said standards and the companion carriage leg and has a toe at its inner end bearing against a transverse side of the respective leg and an outer hook engaging with the longitudinal outer side of the respective standard, and a bolt connecting the central part of said plate with the respective standard, a cutter mounted on said arm, and means for moving the article to be cut toward and from said cutter.

2. A machine for cutting articles comprising a main frame, a carriage adjustable vertically on the upper part of this frame, a cutter mounted on this carriage, means for moving the article to be cut relative to said cutter, and means for raising and lowering said carriage including a vertical shifting rod connected with said carriage, a casing which is mounted on the main frame and receives said rod and is provided with upper and lower shoulders, an upwardly inclined clutch member resting on one of said shoulders and having front and rear gripping edges engaging with opposite sides of the shifting rod and a downwardly inclined clutch member resting on the other of said shoulders and having front and rear gripping edges engaging the opposite sides of said rod, and means for tilting said members to release their respective gripping edges from said rod.

3. A machine for cutting articles comprising a main frame, a cutter mounted on the upper part of said frame, a vertically movable elevator adapted to support the article to be cut, and means for controlling the movement of said elevator including upper and lower parallel controlling links pivotally connected at their opposite ends with said elevator and frame, a foot lever pivoted on the frame and provided at its front end with a pedal, and a lifting link connecting the rear end of said foot lever with one of said controlling links.

4. A machine for cutting articles comprising a main frame, a cutter mounted on the upper part of said frame, a vertically movable elevator adapted to support the article to be cut, and means for controlling the movement of said elevator including upper and lower parallel controlling links pivotally connected at their opposite ends with said elevator and frame, a foot lever pivoted on the frame and provided at its front end with a pedal, a lifting link connecting the rear end of said foot lever with one of said controlling links, means for adjusting the connection between said lifting link and the respective controlling link lengthwise of these links, and means for adjusting the connection between said lifting link and foot lever lengthwise of the latter.

5. A machine for cutting articles comprising a main frame, a cutter mounted on the upper part of said frame, an elevator movable vertically relative to said cutter and including a horizontal track and downwardly projecting legs, a table movable horizontally on said track and adapted to support the article to be cut, means for controlling the vertical movement of said elevator including upper and lower parallel controlling links pivotally connected at opposite ends with said main frame and said elevator legs, a foot lever pivoted on said main frame and operatively connected with one of said controlling links, and a balancing spring connecting said lever with the main frame.

6. A machine of the character described comprising a main frame, a carriage adjustable vertically on said frame and provided with a horizontal shelf, a supporting arm slidable horizontally on said shelf and provided with horizontal slots, fastening bolts passing through said slots and the adjacent parts of said shelf, and a disk cutter mounted on said arm.

7. A machine of the character described comprising a main frame, a carriage adjustable vertically on said frame, a supporting arm adjustable horizontally on said carriage, a disk cutter mounted on said arm, and means for presenting the material to be cut to said cutter including an element movable vertically relative to said cutter and another element movable horizontally on said first mentioned element and adapted to support the material to be cut.

8. A machine of the character described comprising a main frame, a carriage adjustable vertically on said frame, a supporting arm adjustable horizontally on said carriage, a rotary disk cutter mounted on said arm, and means for presenting the material to be cut to said cutter including a vertically movable elevator mounted on said frame and having horizontal tracks, a table for supporting said material movable horizontally on said tracks, and stop means for limiting the forward movement of said material on said table including longitudinal bars slidable horizontally on said table and a stop bar connected with the front ends of said longitudinal bars and adapted to be engaged by the front end of said material.

CHARLES A. MARTIN.